(No Model.) 3 Sheets—Sheet 1.
A. MARTIN.
Breech Loading Fire Arm.
No. 239,662. Patented April 5, 1881.
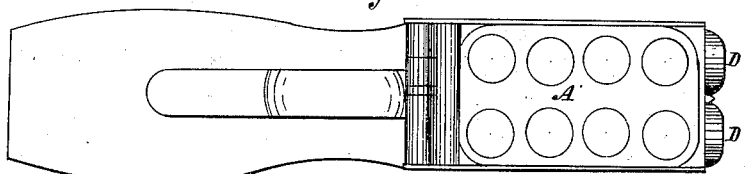
Fig: 5.
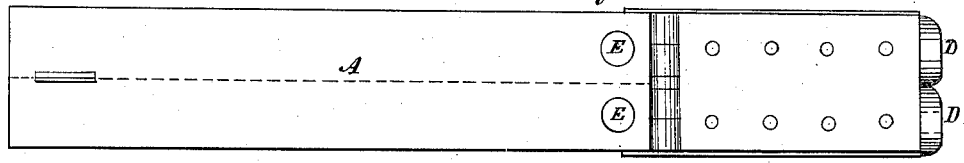
Fig: 4.
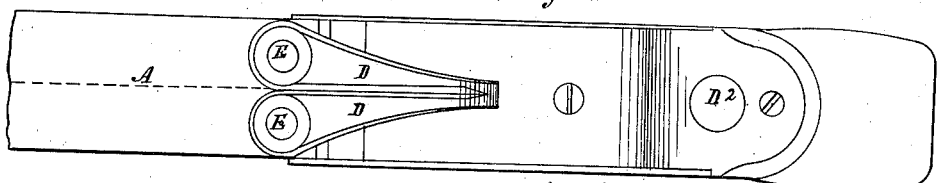
Fig: 2.
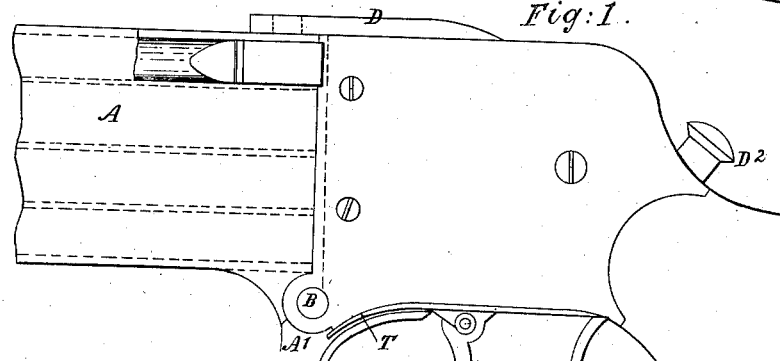
Fig: 1.
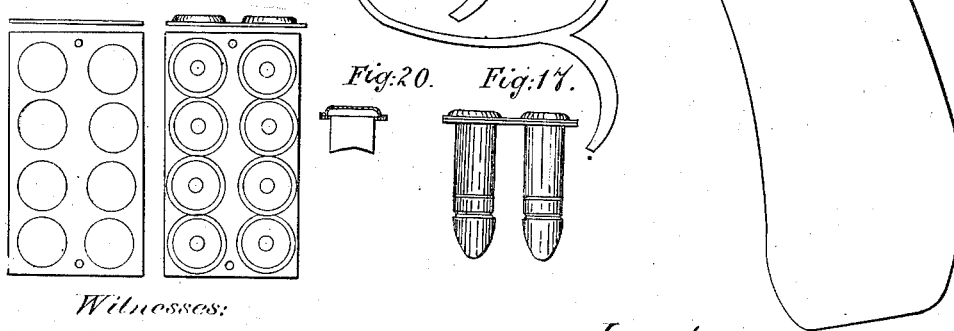
Fig: 18. Fig: 19. Fig: 20. Fig: 17.
Witnesses:
Wm A. Skinkle
Chas. H. Baker
Inventor:
Abraham Martin
By his Attorneys
Baldwin, Hopkins & Peyton (No Model.) 3 Sheets—Sheet 2.
A. MARTIN.
Breech Loading Fire Arm.
No. 239,662. Patented April 5, 1881.
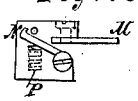
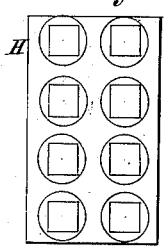
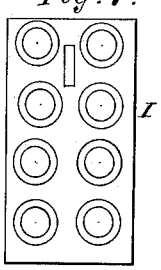
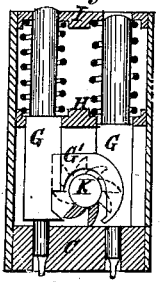
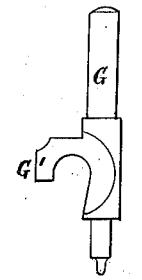
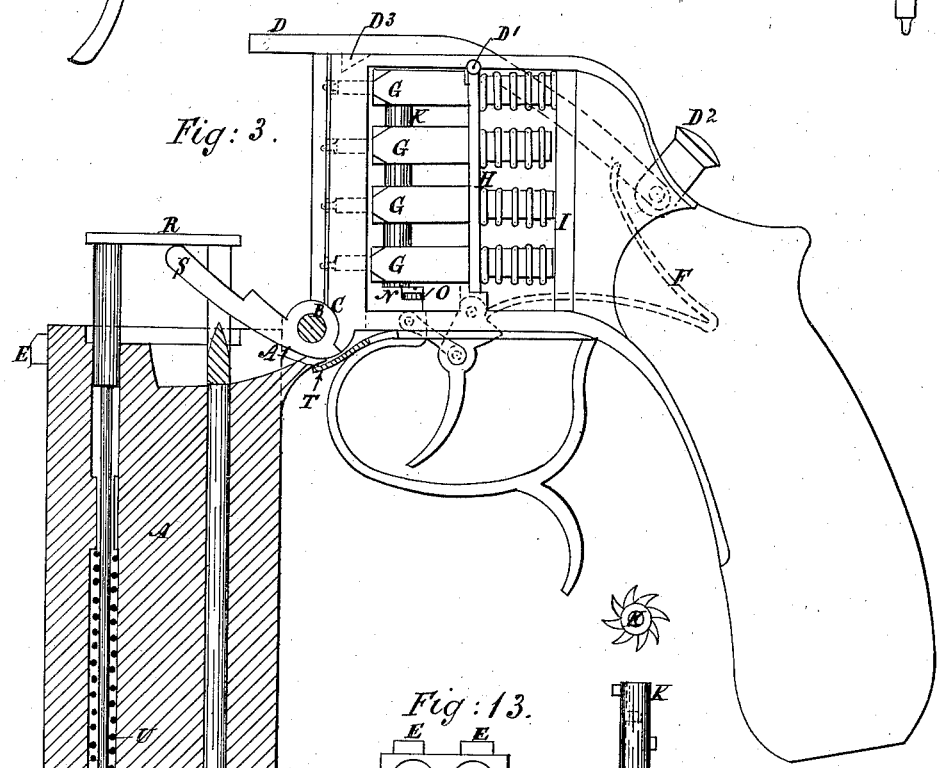
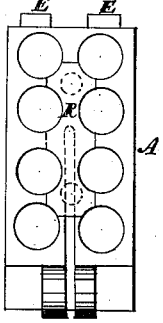
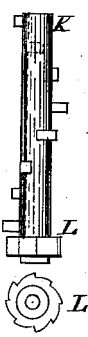
Witnesses
Wm A. Skinkle
Chas. H. Baker
Inventor:
Abraham Martin.
By his Attorneys,
Baldwin, Hopkins & Peyton (No Model.) 3 Sheets—Sheet 3.
A. MARTIN.
Breech Loading Fire Arm.
No. 239,662. Patented April 5, 1881.
Fig: 14.
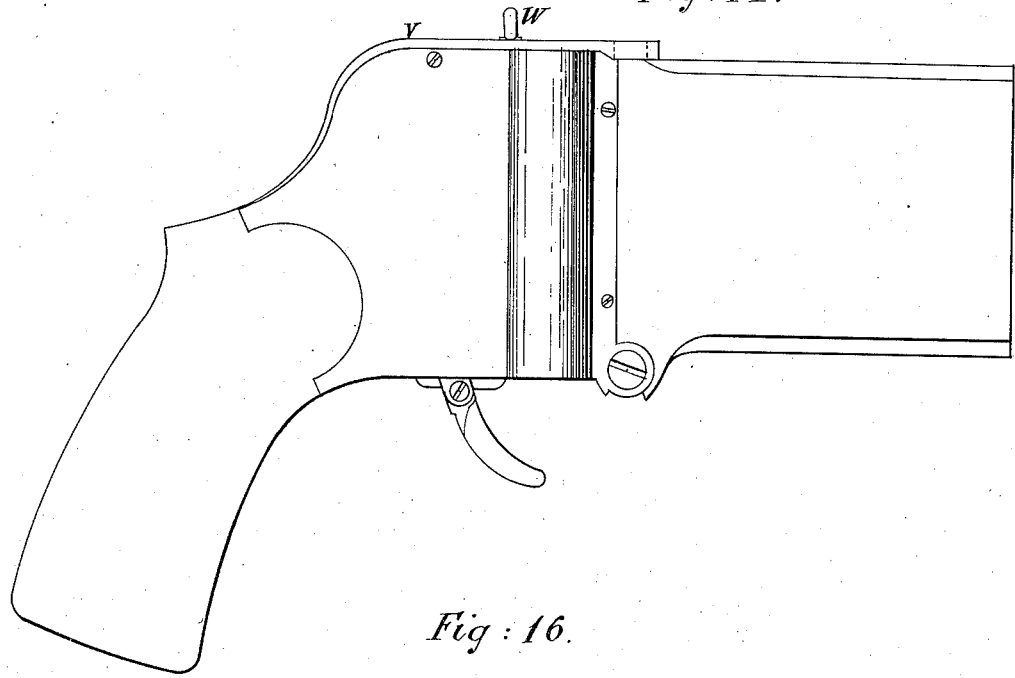
Fig: 16.
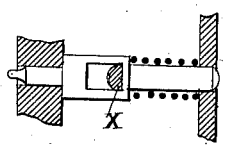
Fig. 15.
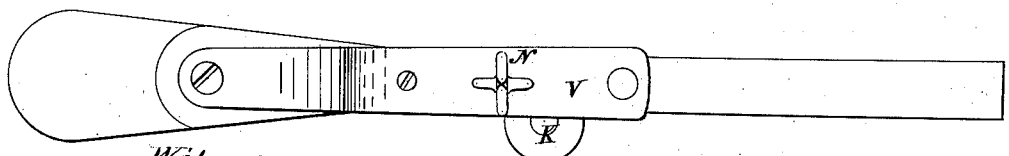
Witnesses,
Wm A. Skinkle,
Chas. H. Baker.
Inventor:
Abraham Martin.
By his Attorneys,
Baldwin, Hopkins & Peyton

UNITED STATES PATENT OFFICE.

ABRAHAM MARTIN, OF STORE STREET, BEDFORD SQUARE, COUNTY OF MIDDLESEX, ASSIGNOR OF A SHARE OR INTEREST TO JOSEPH MARRES, OF LONDON, AND AUGUSTUS FRANCIS PRAENDLIN, OF BIRMINGHAM, ENGLAND.

BREECH-LOADING FIRE-ARM.

SPECIFICATION forming part of Letters Patent No. 239,662, dated April 5, 1881.

Application filed November 30, 1880. (No model.) Patented in England April 14, 1880.

*To all whom it may concern:*

Be it known that I, ABRAHAM MARTIN, a citizen of the French Republic, residing at Store Street, Bedford Square, in the county of Middlesex, England, have invented certain new and useful Improvements in Repeating Pistols and Small-Arms, and in Ammunition for the Same, (for which I have received Letters Patent in England, No. 1,531, dated 14th April, 1880,) of which the following is a specification.

This invention has for its object improvements in repeating pistols and small-arms and in ammunition for the same.

My repeating pistol has the barrels arranged in two vertical rows, say four in each row, or eight in all. They are formed all in one block, which is approximately rectangular in transverse section. The barrel-block is hinged underneath and at the breech end to a breech-plate, which forms the front of the frame or body of the action. The barrels, when they turn downward on the hinge or joint, expose their open breech ends for the reception of the cartridges. When charged, the barrels are closed up against the breech-plate, and they are locked in position ready for firing by a locking-lever. The locking-lever turns upon an axis which passes horizontally through the upper part of the frame or body, and it retains the barrels by catching over studs or projections upon the top of the barrel-block. The studs or projections are inclined at the back, and when, after loading the barrels, their muzzles are raised, (which requires merely a swing of the hand in which the pistol is held,) the studs lift the end of the locking-lever and pass it freely. The locking-lever is provided with a spring, which causes it to return immediately the studs have passed its end, and the studs enter holes formed in the locking-lever to receive them. There is also a tooth or ridge, formed on the under side of the locking-lever, which, at the same time that the lever catches the studs, enters a groove or recess in the frame or body, and so ties it and the barrels very securely together. The tail of the locking-lever passes down through a slot formed in the top of the body, and its end projects out again through the tang which serves to connect the stock to the frame. A button is formed or attached on the rear end of the locking-lever in such a position as to be reached conveniently by the thumb of the hand in which the pistol is held, and when this button is pressed down the opposite end of the locking-lever is raised. In this way the barrels are released when it is desired to open the breech for reloading, and the weight of the barrels causes them to fall. As the barrels descend an extractor throws out the empty cartridge-cases, and the barrels are left free ready to be reloaded.

The face of the breech-plate is perforated to receive the strikers by which the cartridges are fired. There are eight of these strikers, one for each barrel, and their positions are such that, the pistol being loaded and closed for firing, each striker, when thrown forward, strikes upon the priming-cap of a cartridge. Around the stem of each striker for a portion of its length a spring is coiled. This portion of the stem (its hinder end) is round, but the front part of the stem (immediately behind the pin or point which passes through the perforation in the breech-plate) is square and somewhat larger than the round part on which the spring is coiled, so a shoulder is formed. All these eight springs are held compressed between two parallel plates fixed within the body or frame, and the stems of the strikers pass through these plates. The holes in the front plate are square, and the square portions of the strikers are able to pass back through them. The strikers are operated by means of cam-like teeth upon a vertical axis placed between them. This axis also has a ratchet of eight teeth at its lower end, and the trigger, when pulled, gives motion to it. The trigger is connected by a link to a slide carrying a claw-pin jointed to it. This claw engages with the teeth of the ratchet, and for each movement of the trigger it turns the axis round one-eighth of a revolution. The axis being thus turned, one of the cam-like projections upon it comes against a corresponding projection or shoulder formed upon one of the strikers and forces it back against the resistance of its coiled spring.

As the shoulders or projections from the strikers on which the cam-like teeth act are required to lie all on one side of the axis, the strikers on one side of the axis are provided with arms crossing over to the other side into position for the cam-like teeth to act upon them. Each tooth, as it moves round after pushing back the striker, allows it to escape, when the spring immediately throws the striker forward. The striker, thus violently thrown forward, strikes the priming-cap of one of the cartridges and explodes it. The spring of the striker, however, does not follow it up to the end of its travel, but is stopped by the plate, which confines it at the moment when the point of the striker is flush with the face of the breech-plate. The momentum acquired by the striker carries it forward beyond the face for the short distance necessary to deliver the blow to the priming, but the striker is then free and is not supported by the spring. The cam-like projections are so set around the axis that one of them acts at each movement of the trigger upon its corresponding striker. It thus requires eight movements of the trigger to complete the rotation of the axis and the discharge of all the barrels, each barrel being fired in its turn. One V-spring serves both for the locking-lever and as a trigger-spring to throw the trigger forward as soon as it is released by the finger.

The extractor consists of a piece inlaid at the breech end of the barrels, as in pistols at present made. It is worked by a lever which is free to turn on the joint-pin connecting the barrels to the body of the pistol. As the barrels fall in opening the breech a projection on the lower end of this lever comes against a spring-stop, and so the lever receives a movement, (relatively to the barrels,) and it forces the extractor back, throwing the cartridge-cases out of the barrels. As the movement of the barrels in opening the breech is on the point of completion the spring-stop is moved so as to release the extractor-lever. A spring then at once returns the extractor to its place.

In order to facilitate the loading, the eight cartridges forming a charge are combined together and held in their proper relative positions by inclosing their heads between two perforated plates of thin metal—or it might be other suitable material—which, after the cartridges have been inserted between them, are riveted or fastened together. The same method is applicable for combining together the cartridges for charging revolvers and other repeating fire-arms.

In a similar way to that above described for the construction of repeating pistols I also make repeating carbines or guns and hand or portable mitrailleuse, the number of barrels being varied as occasion may require. Sometimes for small pistols I employ only a single row of barrels. I then arrange the axis which actuates the strikers at the side, or it may be at the back. For the locking-lever I substitute a strong spring-catch engaging in a similar manner with a stud on the top of the barrels. I apply in connection with the locking-spring a safety-stop consisting of a turn-button, which has to be turned before the locking-spring can be raised to free the barrels and permit the breech to be opened. The axis of this turn-button passes down in proximity to the strikers and serves as a stop, preventing them projecting beyond the face of the breech-plate except when the turn-button is so placed as to hold down the locking-spring. When the turn-button is in this position a flat upon its axis permits the strikers to protrude to the extent requisite to explode the priming of the cartridges.

My improvements in fire-arms of the kind to which my invention is applied, as above explained, will be specified by my claims after a detailed description.

In order that my invention may be fully understood, I have in the drawings hereunto annexed shown examples of repeating pistols constructed as above described.

Figures 1 to 13 show various views of a repeating pistol with two rows of barrels. In the pistol shown there are four barrels in each row. Fig. 1 is a side view partly in section of the pistol closed and ready for firing. Fig. 2 is a plan view of the same. Fig. 3 is a longitudinal section of the pistol when open, with the extractor in its outward position, and just ready to be drawn back by its spring. Fig. 4 is a front view of the pistol when open, and Fig. 5 a front view when closed.

A are the barrels, formed out of one block, or of several barrels soldered together. This block is hinged at its breech end, at B, to the breech-plate C, which forms the front of the frame or body of the action.

D is the locking-lever by which the barrels, when closed up against the breech-plate, are secured. There are two holes in the forward end of this lever, which catch over two studs, E, that stand up from the top of the barrels A. The lever turns on an axis at D'. The tail of the lever passes down through a slot in the top of the body, and a thumb-piece, D², connected to its end, projects out through the tang. The tail of the lever is acted upon by a spring, F, which tends to turn the lever into a position to lock and hold the barrels. By pressing upon the thumb-piece the forward end of the lever can be raised, and the barrels so released and set free to turn downward on their hinge-joint.

D³ is a tooth or projection across the under side of the forward end of the locking-lever D, which enters a corresponding recess in the top of the frame or body, which thereby forms an abutment to securely hold the barrels up to the breech-plate when the barrels are closed and locked by the lever.

G G are the strikers by which the cartridges are fired. The forward end of each striker passes through the breech-plate C, and its rear end through two plates, H and I, which form part of the body. The strikers are square where they pass through the front one of these plates, (marked H,) while the tail end of each striker is of less width and round, and is surrounded by a strong coiled spring, the ends of which bear against the plates H and I. When any one of the strikers is pressed back the rear end of the square portion of the striker comes against the spring and presses it back, and when the striker is free the spring throws it forward.

Instead of coiled springs flat springs might be used to throw the strikers forward, the strikers, in the same way, being allowed to rebound after being thrown forward.

Face views of the plates H and I are shown at Figs. 6 and 7, and a horizontal section of the body, in which the strikers and their springs can be seen clearly, is shown at Fig 8.

K is the vertical axis, by means of which the strikers are drawn back in succession one after the other. Upon it are cam-like teeth, ranged spirally around it, as shown, one to act upon each of the strikers. The strikers in one row have a recess formed in each of them for one cam to enter and act in. The strikers in the other have projections G' formed upon them for the cams to act against, as is shown more clearly at Fig. 9, which shows one of these strikers separately.

At the lower end of the axis K is the ratchet-wheel L, by which a step-by-step revolving motion is given to it. It is turned round one step each time the trigger is pulled by reason of the trigger being connected by a link, M, to a small slide, N, that carries a claw or pawl, O, to engage with the teeth of the ratchet-wheel L. This claw or pawl is pressed by a small coiled spring, P—or it might be a flat spring—towards the ratchet-wheel.

Separate views of the trigger and slide coupled to it are shown separately at Figs. 10 and 11, so as to show these parts clearly.

Separate views of the axis K are shown at Fig. 12. Each time that the trigger is pulled, and the axis K thereby turned one step, one of the strikers is drawn back by one or other of the cams on the axis, and when this cam gets clear of the striker the striker is thrown forward by its spring and one of the cartridges fired, as before explained. After each time that the trigger is pulled back it is again pressed forward by the spring F, which also acts upon the locking-lever.

When the pistol is formed with a small number only of barrels—say four or two—it is desirable, in order to avoid too long a pull of the trigger, that there should be twice as many teeth in the ratchet-wheel as there are barrels in the weapon. In this case the cams would be so ranged around the axis K that a half-revolution of this axis would fire off all the barrels, and two sets of cams would be used on opposite sides of the axis, which, as the axis was rotated, would come into action alternately.

To reload the pistol when all the cartridges have been fired by successive pulls upon the trigger, the thumb-piece $D^2$ is pressed inward. The barrels are thereby unlocked and drop into the position shown at Fig. 3. As the barrels turn down the empty cartridge-cases are expelled from the rear ends of the barrels by an extractor-plate, R, which, when the barrels were closed, was lying in a recess at the breech end of the barrels, as usual. The extractor-plate is moved outward away from the barrels, so as to throw out the empty cartridge-cases by a lever, S, which is free to turn upon the pin of the hinge-joint by which the barrels are hinged to the body. This lever lies in a recess in the barrel-block and comes behind the extractor-plate. As the barrels turn downward the lever S turns with them until a projection in the lower end of the lever comes against a small pin standing up from a spring, T, which is fixed to the under side of the body. The movement of the lever S is thus arrested, and the extractor-plate is moved away from the rear ends of the barrels into the position shown in Fig. 3, thereby throwing out the empty cartridge-cases. Just at the end of the downward movement of the barrels a projection, A', on the under side of the barrel block comes against the spring T and presses it back, thereby moving the pin-stop out of the way of the projection upon the lever S, so setting this lever free to turn. The extractor-plate is then drawn back into its recess at the rear end of the barrels by means of a coiled spring, U, which acts upon the tail end of one of the guide-rods that carry the extractor-plate, as shown at Fig. 3. A fresh set of cartridges can then be inserted into the rear ends of the barrels, and when the barrels have again been closed and locked against the breech-plate the pistol is loaded and again ready for firing. A face view of the breech end of the barrels and the extractor-plate lying in a recess in it is shown at Fig. 13.

In place of the cams on the axis K being arranged to act against the strikers near their forward end while the springs are around their rear ends, the positions of the springs and of the cam-axis might be reversed.

Figs. 14 and 15 show, respectively, a side view and plan of a similar pistol, having one row only of barrels. In this case, as before explained, the axis K is inclosed within a projection on one side of the body, as shown, or in the body of the pistol, if there is room enough. In these figures is also shown how a simple spring-catch may be used to lock the barrels. V is the spring-catch carried on the top of the body. It locks over a stud on the top of the barrels, as before explained. When the barrels are thus locked the spring-catch is locked and prevented from rising by a turn-button, W. The axis X of this turn-button passes down in proximity to the strikers, and prevents them from being moved forward, except when the turn-button is so placed as to lock the spring. The way in which this is effected is shown at Fig. 16.

Repeating carbines, guns, and hand or portable mitrailleuse may, as before stated, be constructed in a similar manner to that above described. In the latter case the axis K, for actuating the strikers, might be revolved continuously by a handle at its end, instead of step by step.

Figs. 17 to 20 show how I combine together a set of cartridges, forming a complete charge, so as to expedite the loading of a pistol. Fig. 17 shows a pair of the cartridges. Fig. 18 shows a face view and edge view of a thin metal plate through holes in which the front ends of the cartridges are inserted. Fig. 19 shows a face and edge view of another thin metal plate, which is placed behind the rear ends of the cartridges. The heads of the cartridges are thus held between the two metal plates, as shown in the section, Fig. 20, and the two metal plates are riveted or otherwise connected together. For example, small strips, cut in one plate and made to stand up from it, might be passed through holes in the other plate and be turned or riveted over. The back plate has small holes formed in it to allow the strikers of the pistol to pass through and fire the cartridges. This same method of securing together a number of cartridges is, as before stated, applicable also to charging revolvers and other repeating fire-arms. By combining the cartridges together in the above manner they are not held rigidly, though the plates are fixedly connected, but are each capable of a slight independent movement, and so can readily adapt and adjust themselves to the barrels when being pushed forward into them.

I am aware that repeating fire-arms in various respects more or less like those hereinbefore described or referred to in connection with my improvements are well known and were invented prior to my invention, and my claims are accordingly confined to my said improvements. I expressly disclaim the combination, broadly considered, of a cam axis and a ratchet-wheel thereon operated by pawl mechanism for actuating firing-pins or strikers, as this is old. The manner of connecting a number of cartridges by plates confining their heads or flanges is not herein claimed, this part of my invention being reserved for a separate application.

Having thus described the nature of my invention and the manner of performing the same, I would have it understood that I claim—

1. The combination of the breech-plate, the plate H, the plate I, the series of strikers arranged in a vertical row and reciprocating in said plates, the springs confined between the plates H and I and acting on the striker-stems, and the vertical axis K, provided with the projecting cams or teeth, arranged spirally around it and acting upon the strikers between the plate H and the breech-plate, all substantially as and for the purpose hereinbefore set forth.

2. The combination of the cam-axis, the ratchet-wheel thereon, the spring-pawl, the slide upon which it is carried, the trigger, and the link coupling it with said slide, substantially as and for the purpose hereinbefore set forth.

3. The combination of the two rows of strikers, the axis K, situated between the said rows and at right angles with the strikers, and cams standing out from said axis and acting, during rotation of the axis, in succession upon the strikers in the two rows, the strikers in one row being recessed, and those in the other formed with projections, substantially as hereinbefore set forth.

A. MARTIN.

Witnesses:
CHAS. BERKLEY HARRIS,
JOHN DEAN,
Both of No. 17 Gracechurch Street, London.